United States Patent [19]

Khanna

[11] 3,960,790
[45] June 1, 1976

[54] DISC RECORD AND METHOD OF COMPOUNDING DISC RECORD COMPOSITION

[75] Inventor: Sarwan Kumar Khanna, Indianapolis, Ind.

[73] Assignee: RCA Corporation, New York, N.Y.

[22] Filed: Mar. 25, 1974

[21] Appl. No.: 454,156

[52] U.S. Cl. .............................. 260/23 XA; 106/37; 260/28.5 D; 260/34.2; 260/45.7 S; 260/45.75 K
[51] Int. Cl.² ......................................... C08L 91/00
[58] Field of Search ............... 260/23 XA, DIG. 19, 260/45.75, 42.49, 899, 34.2; 106/37; 428/65; 274/41 A

[56] References Cited
UNITED STATES PATENTS

| | | | |
|---|---|---|---|
| 2,563,414 | 8/1951 | Parker | 260/42.49 X |
| 2,581,836 | 1/1952 | Cresswell | 117/138.8 |
| 2,993,234 | 7/1961 | Miura et al. | 264/107 |
| 3,048,557 | 8/1962 | Siddall | 260/34.2 |
| 3,225,073 | 12/1965 | Glabisch | 260/401 |
| 3,351,577 | 11/1967 | Krumm | 260/42.49 X |
| 3,481,893 | 12/1969 | Pungs et al. | 260/42.49 X |
| 3,535,256 | 10/1970 | Siano | 260/45.75 |
| 3,539,636 | 11/1970 | Dorfelt | 260/23 XA |
| 3,846,361 | 11/1974 | Sands | 106/37 X |

OTHER PUBLICATIONS

Cyanamid; Plastics Additives Technical Bulletin; "Catanac 609 Antistatic Agent".
Cyanamid; Plastics Additives Antistatic Agents—Product List; A–6.

*Primary Examiner*—Lewis T. Jacobs
*Attorney, Agent, or Firm*—Glenn H. Bruestle; Arthur E. Wilfond; Birgit E. Morris

[57] ABSTRACT

A method of making a disc record molding composition by compounding a copolymer of vinyl chloride-vinyl acetate and a homopolymer of vinyl chloride, with carbon black, a resin stabilizer, a resin plasticizer, an antistatic agent and a mold release agent in a series of blending steps which include successive increases in temperature, that results in a product capable of taking an unusually high signal density per unit of groove wall area.

1 Claim, No Drawings

DISC RECORD AND METHOD OF COMPOUNDING DISC RECORD COMPOSITION

BACKGROUND OF THE INVENTION

High quality monaural phonograph records containing little or no inorganic fillers have long been made of compositions comprising synthetic resins such as copolymers of vinyl chloride-vinyl acetate or polystyrene. It has also been conventional to include certain additives in small amounts in the compositions to improve the record molding process or to impart particular desirable properties to the record. Typical additives are stabilizers to inhibit decomposition of the resin during the mixing and molding operations, plasticizers to enhance the molding properties of the resin, solid antistatic agents to prevent collection of dust in the sound grooves of the record, carbon black to impart a uniform coloration and sheen to the record, and mold release agents to inhibit damage to the record when it is released from the mold.

With the advent of 2-channel stero recordings, some changes were made in certain additives such as stabilizers, but the resin systems remained essentially similar to those used in the older monaural recordings.

In the case of both the older monaural system records and the newer 2-channel stereo records, the process of compounding the ingredients is essentially the same. All of the ingredients are introduced at the same time into a mixing apparatus (usually a Banbury mixer) and thoroughly dispersed until they become a uniform mixture. Due to internal friction within the composition, during the mixing process the temperature rises to the fusion point of the mixture and the mixture is thus converted to a melt which is later either sheeted, cooled and ground into granules, or handled as a molten material in an extrusion apparatus which feeds an automatic record press.

Now, however, 4-channel stereo systems have been developed and these have placed much more stringent demands on the recording material of the phonograph record discs. The discrete 4-channel record is based upon the success of reliably reproducing signals up to 45 kHz from the recorded groove. Two-channel stereo records, on the other hand, require reproducing a signal bandwidth approaching but not exceeding 15 kHz. The higher the frequency of the actual recorded signal, the greater must be the number of recorded undulations per unit of groove length.

A 2-channel stereo groove has undulations of 2 different bandwidths molded into the opposite sloping walls of the record groove. The pickup stylus, riding in the groove, vibrates at both of these frequencies and the sound signal reproducing system separates these 2 signals and feeds them to separate amplifiers and speakers.

In a 4-channel system, 2 different fm carriers are superimposed on the groove walls in addition to the undulations required for a 2-channel system. Each of these carriers is independently frequency modulated by a signal source associated with a particular carrier.

The higher bandwidth requirement of 4-channel stereo records results in a requirement for reproducible signal density per unit of groove wall area, 3 times as great as that required for 2-channel stereo records and this requirement is superimposed upon the modulation of the basic stereo groove which already requires a reproducible bandwidth of 15 kHz. Thus, the signal density requirement in a discrete 4-channel record groove is 4 times that for a 2-channel stereo groove.

There are also other requirements for a satisfactory 4-channel stereo phonograph record that are not present, or at least not present to the same extent, in ordinary monaural or 2-channel stereo records. In the 4-channel system records, the record surface must not only have the best obtainable long-wearing properties, but the surface must also wear in a smooth manner instead of in a porous granular manner previously experienced. If the surface does not have the required wearing properties, the fm carrier modulations are degraded and very small particles of record material become broken off the groove walls.

An additional problem arises if the broken away particles of record material accumulate in the bottom of the record groove. Then the pickup stylus starts to ride higher in the groove and does not make full contact with the groove walls. When this happens, the stylus contacts a smaller area of wall, pressure on the wall becomes correspondingly greater, and record wear becomes more rapid. When record wear becomes more rapid, sound reproduction deteriorates more rapidly.

Using the older system of mixing all of the record composition ingredients together at one time, the present inventor found that he could not make commercially acceptable 4-channel stereo records, regardless of the composition variations that he tried. However, with the present invention, which includes an improved mixing process and also includes a proper selection of ingredients and proportions of ingredients, commercially acceptable 4-channel stereo records have now been achieved.

DESCRIPTION OF PREFERRED EMBODIMENTS

The ingredients of the preferred composition used in the present process are (expressed as percent by weight of the final composition):

1. 60–70% of a copolymer of vinyl chloride-vinyl acetate resin suspension or solution containing 12–16% by weight of polyvinyl acetate.

2. 26.2–36.2% of a suspension or solution type homopolymer of vinyl choride having an inherent viscosity of 0.65.

These two resin ingredients should total 96.2%.

3. 1.6% of a sulfur-free organotin salt containing about 16% tin. A suitable example is dibutyltin di(isooctyl maleate).

4. 1% of a soybean oil epoxide having a molecular weight of about 1000. A suitable commercial example is "Paraplex G-62" (Rohm and Haas Co., Philadelphia, Pa.).

5. 1.2% of a 50% by weight solution of N,N-bis(2-hydroxyethyl)-N-(3'-dodecyloxy-2'-hydroxypropyl) methylammonium methosulfate (which will hereinafter be referred to as "methylammonium methosulfate") in a 1:1 by volume isopropyl alcohol-water mixture.

6. 0.4% of an esterified montan wax such as "Hoechst Wax E".

7. 0.2% of carbon black of 181 angstroms fineness.

The ratio between the copolymer of vinyl chloride-vinyl acetate and the homopolymer of polyvinyl choride, was determined in relationship to the requirement of a long wearing surface for the record grooves and the melt viscosity of the total compound at the temperature at which the record is pressed. This results in a surface that wears in a smooth manner and not in a porous granular manner as heretofore experienced. At the same time, this ratio between the two resins produces, in conjunction with certain others of the ingredients, a melt viscosity and melt elasticity at the temperature at which the record is pressed that assures that the record grooves are filled without fault.

Two-tenths percent of carbon black is used to give the finished record the characteristic black color associated with phonograph record discs and the 181 angstrom fineness is preferred to maintain surface quietness in the groove. The specified amount of carbon black gives the characteristic black sheen appearance to the record. Other ingredients are adjusted to this amount.

One-and-two-tenths percent of the methylammonium methosulphate solution (corresponding to 0.6% of the solid in the finished record) gives the finished record surface electrical conductivity to limit its capacity to maintain a static charge that would otherwise be induced by its handling and play on a phonograph turntable. This anti-static property imparted into the record by this solution is generally advantageous inasmuch as the record does not collect dust and lint from the atmosphere and its packaging, and does not erratically and randomly discharge to the supporting structure of the pickup stylus. The use of the above mentioned anti-static agent is particularly advantageous for the discrete 4-channel record inasmuch as debris that is generated by the pickup stylus riding in the record groove is not attracted to the bottom of the groove to be compressed by the subsequent plays until its buildup interferes with full contact between the pickup stylus and the groove. Instead, the debris generated by wear of a record with anti-static properties is free to be pushed aside by the playback stylus on subsequent plays. In addition, it is free to fall from the record surface as the record is handled and is free to be brushed from the record when the record is cleaned. One-and-two-tenths percent of a 50% methylammonium methosulphate solution is the limit of the absorptive capacity of the resin. Lesser amounts are less effective in controlling static charge buildup. Greater amounts cause surface imperfections that produce noise when the record is played.

One-and-six-tenths percent of an organotin salt (resin stabilizer) is included in the compound to neutralize the generation of hydrogen chloride gas (which is produced by partial decomposition of the polyvinyl chloride resin) when the compound is pressed into a record at the normal pressing temperature. The presence of hydrogen chloride gas creates blisters and voids under the record surface and in the record surface, which cause noise when the record is played. The hydrochloric acid also etches and stains the stampers in the press. The etching and staining of the stampers then introduce imperfections in the molded record that produce noise when the record is played. If substantially less than the specified amount of organotin salt is used, generation of hydrogen chloride gas results. If more than the stated amount is used, the excess organotin salt particles are not absorbed or assimilated into the compound and become themselves the source of noise when the record is played.

One perent of epoxidized soybean oil (the plasticizer) provides a lower melt viscosity of the mixture, which reduces the internal friction of the mixture when it is pressed into a record and thereby improves the moldability by filling the groove with less compression force. Also, the epoxidized soybean oil has a stabilizing function in that it combines with the organotin salt to further limit the generation of hydrogen chloride gas. One percent has been determined as the optimum amount to be absorbed completely into the resin particles. More than 1 percent over-saturates the resin thereby producing oily splotches on the surface of the record, and the splotches result in noise on playback.

Four-tenths percent of montan wax ester is added to the compound to provide for good release of the record from the stamper. When the record is removed from the press without the lubricating effect of the montan wax ester in the compound, the grooves of the record are sometimes fractured, torn, and deformed by the removal. These faults in the groove produce noise on playback. Montan wax ester at the stated percentage is compatible with the resins and is homogenized into the surface of the record at the normal pressing temperature. If more than the stated amount of the montan wax ester is used, the excess amount is not absorbed into the surface of the record. Its presence results in non-uniformity in the surface of the record, particularly as related to the friction between the stylus and the groove. This non-uniformity produces noise when the record is played.

It has been determined that the order and sequence of mixing the ingredients together into the compound is of primary importance. By the method to be described below, the full dispersion of the ingredients throughout the total volume of the mixture, and the absorption of the ingredients by the resin particles can both be assured.

EXAMPLE

The first compounding step is that of combining the copolymer of vinyl chloride-vinyl acetate, the homopolymer of vinyl chloride and the carbon black. These ingredients are blended in an internal high intensity mixer. If the mixer is an internal mixer being operated at a speed of 800 rpm (hereinafter referred to as "initial" speed) the ingredients can be thoroughly and uniformly dispersed in 1 minute. To test for uniformity of dispersion, a sample of the mix may be taken and pressed into plaques about 1–2 mils thick. These can be visually examined under a microscope.

After thorough and uniform dispersion of the resins and the carbon black has been achieved, the mixing speed is preferably doubled (with reference to the initial speed) and the mixer is operated at this higher speed until the mixture reaches a temperature of about 115°–120° F. The temperature is raised to this level to swell the resin particles so that they can more readily absorb the liquid solution introduced in the next step.

In the second step of the compounding process, the speed of the mixer is preferably reduced to its initial value. The methylammonium sulfate solution is added and mixing is continued until the temperature of the mixture reaches about 125°–130° F. The methylammonium sulfate solution is added at this time and under these conditions because the resin particles are in their most receptive state to absorb the liquid. The rise in temperature is to prepare for the next step.

In the third step of the compounding process, the organotin salt and the soybean oil epoxide, which are both liquids, are added to the mixture, and, during the mixing, are absorbed into the resin particles. During this step, the mixer is preferably operated at twice its initial speed until the temperature of the mixture reaches about 135°–140° F.

Step 4 of the compounding process comprises stopping the mixer, adding the montan wax ester and then again preferably operating the mixer at twice its initial speed until the ingredients reach a temperature of about 150°–155° F. The mixture is also subjected to forced ventilation. The combination of the temperature and ventilation causes moisture and other volatiles to be removed from the mixture.

In step 5 of process, the contents of the mixer are discharged rapidly into a cooling apparatus where the temperature is reduced to about 100° F. The cooling apparatus may, for example, be a jacketed kettle cooled with circulating water.

The sixth step is to place the cooled mixture into a Banbury mixer and run the mixer until the mixture reaches a temperature of about 310° F. At this temperature the mixture ingredients fuse and become a molten mass. The melt may then be rolled into a sheet and the sheet ground into granules which are suitable for charging a molding press.

The molding compound which is made by the process which has been described has not only been found to be particularly suitable for making 4-channel stereo phonograph records but for making other playable discs where the sound groove requirements are extremely exacting. One other use for the compound is in the making of disc records which can be used to play back sight and sound programs through a conventional television set.

Records are molded in conventional manner in a compression molding press.

I claim:

1. A method of compounding a composition suitable for molding high quality disc records, all proportions of ingredients being expressed as % by weight of the final product, said method consisting essentially of:
   in a mixer, compounding about 60–70% of a copolymer of vinyl chloride-vinyl acetate resin suspension or solution containing about 12–16% vinyl acetate, about 26.2–36.2% of a suspension or solution type homopolymer of vinyl chloride having an inherent viscosity of about 0.65 and 0.2% of carbon black having a fineness of 181 Angstroms, and raising the temperature of the composition to about 115°–120° F,
   adding 1.2% of a 50% solution of N,N-bis(2-hydroxyethyl)-N-(3'-dodecyloxy-2'hydroxypropyl)methyl-ammonium methosulfate, and raising the temperature of the composition to about 125°–130° F,
   adding to the mixture about 1.6% of a sulfur-free organotin stabilizer compound containing about 16% by wt. of tin, and about 1% of a soybean oil epoxide having a molecular wt. of about 1000 and raising the temperature of the composition to about 135°–140° F,
   adding to the mixture about 0.4% of an esterified montan wax and raising the temperature of the composition to about 150°–155° F, and removing moisture and other volatiles from the mixture,
   rapidly cooling the composition to a temperature of about 100° F,
   mixing the cooled, dry blend of ingredients such that they are homogeneously fused into a melted mass, and
   cooling the melted mass.

* * * * *